United States Patent
Rogmann et al.

(10) Patent No.: US 7,118,785 B2
(45) Date of Patent: Oct. 10, 2006

(54) SYSTEM FOR COVERING FLOORS

(75) Inventors: Karl-Heinz Rogmann, Ratingen (DE); Ulrike Scheuvens, Erkrath (DE); Heiko Faubel, Wermelskirchen (DE); Michael Decker, Solingen (DE)

(73) Assignee: Ecolab Inc., St. Paul, MN (US)

( * ) Notice: Subject to any disclaimer, the term of this patent is extended or adjusted under 35 U.S.C. 154(b) by 241 days.

(21) Appl. No.: 10/451,466

(22) PCT Filed: Dec. 12, 2001

(86) PCT No.: PCT/EP01/14561

§ 371 (c)(1),
(2), (4) Date: Oct. 14, 2003

(87) PCT Pub. No.: WO02/50205

PCT Pub. Date: Jun. 27, 2002

(65) Prior Publication Data

US 2004/0054067 A1    Mar. 18, 2004

(30) Foreign Application Priority Data

Dec. 21, 2000    (DE) ................... 100 64 413

(51) Int. Cl.
*B05D 5/00* (2006.01)
*B05D 5/02* (2006.01)

(52) U.S. Cl. ............ 427/407.1; 427/264; 427/325; 427/271

(58) Field of Classification Search ......... 524/556, 524/522, 430; 427/264, 325, 271, 407.1
See application file for complete search history.

(56) References Cited

U.S. PATENT DOCUMENTS

| | | | | |
|---|---|---|---|---|
| 3,929,743 A | | 12/1975 | Sramek | |
| 3,983,252 A | * | 9/1976 | Buchalter | 514/698 |
| 4,278,578 A | * | 7/1981 | Carpenter | 524/77 |
| 5,221,337 A | * | 6/1993 | Luers et al. | 106/266 |
| 5,643,669 A | * | 7/1997 | Tsuei | 428/354 |
| 5,676,741 A | | 10/1997 | Gray et al. | |
| 5,782,962 A | | 7/1998 | Burke et al. | |
| 6,410,634 B1 | * | 6/2002 | Rufus et al. | 524/430 |

FOREIGN PATENT DOCUMENTS

| | | |
|---|---|---|
| DE | 3911808 | 10/1990 |
| JP | 2000 136351 | 5/2000 |
| WO | WO98/27162 | 6/1998 |

OTHER PUBLICATIONS

Pflegemittel auf der Basis von Wachsen, Ottom Kuhneweg (1975), 1 page.
Database WPI, Section Ch, Week 200034, Derwent Publications Ltd/, XP002195094 1 page.

* cited by examiner

*Primary Examiner*—David W. Wu
*Assistant Examiner*—Satya B. Sastri
(74) *Attorney, Agent, or Firm*—Andrew D. Sorensen; Anneliese S. Mayer

(57) ABSTRACT

A coating system for floors, containing
a) one or more agents in which, together or separately, a polymer/wax dispersion and aziridine and, where desired, a flatting component are present, for application on the floor in order to form a crosslinked base film that is not capable of being removed by wet chemical means, as well as
b) an aziridine-free agent containing conventional floor-maintenance components, in particular a polymer/wax dispersion, for the purpose of generating a sacrificial film on said base film that is capable of being removed by wet chemical means.

4 Claims, No Drawings

SYSTEM FOR COVERING FLOORS

The present invention is concerned with coating systems for floors which, despite regular cleaning and/or disinfection with agents that contain antimicrobial components, do not turn yellow or become discolored or only undergo such discoloration to a slight extent.

A person skilled in the art generally understands the expression 'polymer-based floor-maintenance agents' to mean, as a rule, classical maintenance agents which are capable of being removed by wet-chemical treatment. These removable maintenance agents are susceptible to disinfectants, particularly those based on alkylamines, quaternary ammonium compounds, alcohols, but also others, and no longer meet the more stringent demands of consumers. In particular, stains caused by skin disinfectants and hand disinfectants, as well as white stains caused by alcohol/water and colored stains caused by marker substances as well as instances of yellowing caused by surface disinfectants based, for example, on quaternary ammonium compounds and also on amine-type active substances continue to lead to complaints from the persons responsible for buildings, by reason of the visual impairments. These problems are observed, above all, in hospitals. But they also occur in attenuated form in an environment where use is made of cleaning agents and/or disinfecting agents that contain the indicated components.

By reason of the disadvantages of classical removable maintenance agents, in recent years it has been observed with increasing frequency that polyacrylates coupled to non-metals are being used in coating films, with the consequence that the resulting maintenance films are difficult to remove by wet chemical means or can no longer be removed by such means. Examples of such films are films that are crosslinked with aziridine and based on polyacrylate. Theoretically, these maintenance films would really never have to be removed if the effective film or films were always to be renewed early enough. But practice has shown that this is not actually put into effect or that the non-removable maintenance film is frequently damaged and thereafter has to be removed mechanically in elaborate manner by erosive means. A further consideration is that in the grinding process the control over the grinding action is also limited, and damage to the covering occurs quite often.

Therefore grinding processes on resilient floors such as PVC, linoleum, rubber, for example, have not been customary hitherto or were until recently ruled out by the manufacturers of coverings.

Consequently the object of the present invention was to make available coating systems in which the outer layer is intended to serve, as it were, as a sacrificial layer and to be capable of being removed simply by wet chemical means, but in which, at the same time, the susceptibility of this simply removable sacrificial layer to discoloration with regard to antimicrobial components is to be minimal.

As is also evident from the examples section of the present invention, no maintenance films are known which are capable of being removed simply by wet chemical means and which, at the same time, display low susceptibility to discoloration in the sense of the present invention.

All the more surprising were the tests within the scope of the present invention, which showed that hardly any or no susceptibility to discoloration was present in respect of a coating system containing one or more base layers of a certain type that are not capable of being removed by wet chemical means and a maintenance layer or sacrificial layer applied thereon that is capable of being removed simply by wet chemical means and that, considered in itself, is susceptible to discoloration.

Accordingly, the present invention provides a coating system for floors, containing a) one or more agents in which, together or separately, a polymer/wax dispersion and aziridine and, where desired, a flatting component are present, for application on the floor in order to form a crosslinked base film that is not capable of being removed by wet chemical means, as well as b) an aziridine-free agent containing conventional floor-maintenance components, in particular a polymer/wax dispersion, for the purpose of generating a sacrificial film on said base film that is capable of being removed by wet chemical means.

In the system according to the invention, a) is preferably to be understood to comprise at least two agents, one of which contains the said aziridine and another of which contains the said polymer/wax dispersion.

In a particularly preferred embodiment of the system according to the invention, a) is even to be understood to comprise at least three agents, a first of which contains the said aziridine, a second of which contains the said polymer/wax dispersion and a third of which contains the said flatting component.

In accordance with the present invention, flatting components are preferably to be understood to be those which are selected from the large group comprising the compounds of silicic acid. For a person skilled in the art, these compounds are those which, for example, are offered for sale by the companies Clariant, BYK CERA, Klein Additec.

The supplementary addition of the flatting component can be an advantage for various reasons. In the sensitive field of application of the present invention, high gloss may constitute a problem. Gloss is frequently mistakenly confused with smoothness. A further consideration is that stains in and on the maintenance film are particularly accentuated by gloss.

An attempt is often made to comply with the desire of consumers for less gloss by incorporating flatting agents. However, none of the products that contain flatting agents and that have been on the market hitherto is stable in storage. By reason of the low viscosity of the polymer dispersions, the flatting agents cream up, partly clot, or settle out on the floor. The products are predominantly offered for sale in 10-liter casks, so that sufficient homogenisation as a result of shaking of the cask does not take place.

In the service industry it is, moreover, not customary to employ stirrers for the purpose of homogenisation, as is customarily done by, for example, those responsible for laying floors and parquet flooring, where multi-component systems, also with flatting agents for example, are more frequently processed directly on site.

Therefore in the sense of the present invention it is an advantage to make the flatting component available, where desired, in the form of a separate agent and to use it only as needed.

In the system according to the invention the volumes of the casks in which the agents stated under a) have been decanted are preferably so chosen that when the complete contents of the casks are intermixed a mixture is present that exhibits precisely the ratio of the essential components for the system according to the invention that is desired for the formation of the base film or films.

In this connection it is particularly preferred if the volume of one of the stated casks, preferably that one in which the largest agent by volume is located, is so chosen that sufficient space is available to accommodate the contents of the additional stated cask or casks and to produce the desired mixture.

It is preferred, moreover, that in the system according to the invention at least two of the agents a) and/or b) contain conventional floor-maintenance components selected from the group comprising waxes, surfactants, film-forming polymers and mixtures thereof, in which case, in particular, film-forming polymers are contained having a minimal film-forming temperature between 0 and 90° C.

The stated film-forming polymer is preferably selected from polyurethanes and/or polycarboxylates, in particular from polyacrylates.

It is preferred, moreover, that a) is to be understood to comprise several agents, one of which is free of aziridine and contains a polymer/wax dispersion and is identical with the formulation of agent b).

For the system according to the invention it is likewise preferred that one or more of the agents a) and/or b) contain surfactants, the total content of surfactants amounting, relative to the respective agent a) and/or b), preferably to 1 to 35 wt. %, particularly preferably 3 to 10 wt. %. The expression 'total content' is to be understood as relating only to one of the surfactant-containing agents and not to the sum of all the agents that are present in accordance with the invention.

The surfactants are very particularly preferably selected from non-ionic surfactants, in particular from alkyl polyglucosides, and from anionic surfactants, in particular from the group comprising the alkyl sulfates, alkyl sulfonates, olefin sulfonates, ether sulfates, soaps, fluorinated surfactants, silicone surfactants and mixtures thereof.

The present invention further provides a process for the treatment of coating systems that are present in accordance with the invention with cleaning agents and/or disinfecting agents containing one or more antimicrobial components selected from the group comprising the alcohols, aldehydes, antimicrobial acids, carboxylic esters, acid amides, phenols, phenol derivatives, diphenyls, diphenyl alkanes, urea derivatives, oxygen acetals, nitrogen acetals, oxygen formals, nitrogen formals, benzamidines, isothiazolines, phthalimide derivatives, pyridine derivatives, antimicrobial surface-active compounds, quaternary ammonium compounds, antimicrobial alkylamines, guanidines, antimicrobial amphoteric compounds, quinolines, 1,2-dibromo-2,4-dicyanobutane, iodo-2-propinylbutyl carbamate, iodine, iodophors, peroxides.

In this connection it is particularly preferred if the cleaning agents and/or disinfecting agents contain one or more antimicrobial components selected from the group comprising the quaternary ammonium compounds, alkylamines and Glucoprotamin® and in particular if the stated antimicrobial components are selected from the group comprising the alkyl propylenediamines having the general formula I

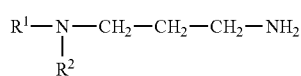

(I)

in which $R^1$ signifies an alkyl or alkenyl group with 8 to 18 carbon atoms and $R^2$ signifies hydrogen, an alkyl group with 1 to 4 carbon atoms or an aminoalkyl group with 2 to 4 carbon atoms, and the products known as Glucoprotamin®, such as are available from alkyl propylenediamine of the formula II

(II)

in which $R_3$ stands for a linear alkyl group with 12 to 14 carbon atoms, by conversion with compounds of the formula III

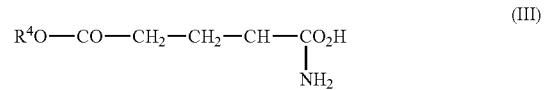

(III)

in which $R^4$ stands for hydrogen or an alkyl group with 1 to 4 carbon atoms, in a molar ratio of 1:1 to 1:2 at 60 to 175° C.

It is still more preferred if the stated antimicrobial components are selected from Glucoprotamin®, N,N-bis(3-aminopropyl)laurylamine, N-dodecyl-1,3-propanediamine, N-coco-1,3-propanediamine or a mixture of these, whereby in the special case the stated antimicrobial component is Glucoprotamin®.

By virtue of the process according to the invention it is preferably ensured that the extent of yellowing and/or staining is diminished in comparison with the extent occurring in the case of conventional coating systems with a sacrificial layer that is capable of being removed by wet chemical means. In the following, the invention summarises the visually recognisable changes to the surface which occur, such as yellowing and/or staining, generally under the term 'discolorations'.

The present invention further provides a process for coating floors, in which, in one process step, a base film containing aziridine-crosslinked polymers, where desired intermixed with flatting components, is applied, and, after drying, a sacrificial film containing conventional maintenance components for floors, in particular a polymer/wax dispersion, is applied directly onto the stated base film in a further step. In this connection the subject-matter is to be understood in such a way that it is entirely possible for yet other coatings to be applied beneath the base film. The essential point in the sense of the present invention is that the film serving as basis for the sacrificial film or maintenance film that is not crosslinked with aziridine is to be understood as being the base film.

In the process according to the invention it is preferred that i) prior to application of the stated base film the agents that are present in conformity with the system according to the invention have been decanted in casks, the volume of which is so chosen that when the complete contents of the casks are intermixed a mixture is present that exhibits precisely the ratio of the essential components in conformity with the system according to the invention that is desired for the formation of the base film, and j) the agents are prepared by bringing together and intermixing the entire contents of the stated casks for the application of the stated base film.

In this connection the bringing-together and intermixing of the entire contents of the stated casks are preferably carried out in one of the stated casks, particularly preferably in that cask in which the largest agent by volume is located.

If a) is to be understood to comprise several agents, one of which is, in accordance with the invention, identical with b), there is preferably the possibility of dispensing with one cask. In this case, for the base coating a first portion of the agent b) that is identical with a) would be intermixed with the additional agents a), namely the agents containing aziridine and/or, where desired, flatting components, and applied. After drying of the base film, the remaining portion of the agent b) that is identical with a) could then be applied partially or wholly by way of sacrificial layer.

The present invention also provides a floor coating in which a sacrificial film containing conventional maintenance components for floors and, preferably, antimicrobial components is applied directly onto a base film containing aziridine-crosslinked polymers and, where desired, a flatting component.

EXAMPLES

In several series of tests the influence on the appearance of various coating systems was investigated in the case of regular treatment with disinfectant solutions.

TABLE 1

Ingredients of the coating formulations [in wt. %]

| Ingredient | B1 | B2 | B3 |
|---|---|---|---|
| Zn-crosslinked polyacrylate | — | 20 | — |
| Non-crosslinked polyacrylate | 18 | — | — |
| Aziridine-crosslinked polyacrylate | — | — | 19 |
| Wax dispersion based on polyethylene/polypropylene | 3 | 3 | 3 |
| Polyurethane dispersion | 2 | 2 | 2 |
| Non-ionic surfactant: fatty alcohol with 6–7 EO groups | 2 | 2 | 2 |
| Remainder to 100 wt. %: water and additional conventional substances for floor-coating agents | | | | for example, permanent plasticizers (optionally tributoxyethl phosphate), temporary plasticizers (such as ethyl diglycol), flow promoters (such as non-ionic surfactants or other wetting agents)

The various floor-coating systems to be tested were produced using the floor-coating formulations B1 to B3 according to Table 1. For the purpose of producing the floor-coating systems, the floor-coating formulations B1 to B3 were evenly distributed, by themselves or above one another, in quantities of, in each case, 10 ml with the aid of a manual application instrument on PVC sheets with a size of 30 cm×60 cm. In the case where several coatings were applied above one another, care was taken prior to application of the additional coating to ensure that the coating film already present had sufficient time for drying. The coating systems that were prepared in this way are compiled in Table 2.

TABLE 2

Coating systems for implementation of the tests

| Coating system | Type of coating |
|---|---|
| V1 | Only one coating film: B1 |
| V2 | Only one coating film: B2 |
| V3 | Three coating films B1 |
| V4 | Two coating films: B1; above it one coating film: B2 |
| V5 | Three coating films: B2 |
| V6 | Only one coating film: B3 |
| E1 | Two coating films: B3; above it one coating film: B2 |

The PVC sheets which were coated with the respective floor-coating formulations were prepared in duplicate and stored at 40° C. in a darkroom.

A first series of the test objects which had been stored in this way was wiped in the darkroom three times a day at approximately two-hourly intervals with a surface-disinfectant solution in which, by way of antimicrobial component, Glucoprotamin® was present in a concentration of 0.25 wt. % relative to the entire solution.

A second series of the test objects which had been stored in this way was wiped in the darkroom three times a day at approximately two-hourly intervals with a surface-disinfectant solution in which, by way of antimicrobial components, dimethylalkyl(C12–14)benzylammonium chloride (benzalkon) in a concentration of 0.15 wt. % and polyhexamethylene biguanide in a concentration of 0.05 wt. % were present, relative to the entire solution.

After 70 days the test objects were withdrawn from the darkroom and the yellowing was evaluated visually by trained specialist staff.

In this connection the scale of evaluation extended from −5 (=very strong discoloration) to 0 (no discoloration of any kind).

The results can be gathered from Table 3.

TABLE 3

Evaluation of the discoloration of the coating systems from Table 2 after 70 days of storage in the darkroom at 40° C. and regular treatment with disinfectant solutions

| Coating system | Discoloration after treatment with Glucoprotamin ® solution | Discoloration after treatment with benzalkon/biguanide solution |
|---|---|---|
| V1 | −5 | −4 |
| V2 | −5 | −5 |
| V3 | −5 | −4 |
| V4 | −5 | −4 |
| V5 | −5 | −5 |
| V6 | 0 | 0 |
| E1 | −1 | −1 |

In the course of the tests it became evident that the aziridine-crosslinked coating film was not susceptible to the conditions obtaining in the test and did not result in discoloration of any kind.

Totally surprising, however, was the fact that in the case of example E1 according to the invention the susceptibility of the outer coating (sacrificial layer) to discoloration was so slight. This could not be expected, since, as was shown in the remaining tests, the sacrificial layer that was present in the case of E1 had a strong tendency towards discoloration under the chosen conditions. The fact that one or more aziridine-crosslinked coating films (base layer) is/are present directly beneath the sacrificial layer could not lead to the assumption that the susceptibility of the sacrificial layer was thereby reduced.

The invention claimed is:

1. A method of coating and disinfecting a floor comprising:
   a. applying a base film composition to the floor, the base film composition comprising:
      i. a polymer selected from the group consisting of polyurethanes, polyacrylates, and mixtures thereof; and
      ii. an aziridine, wherein the polymer and the aziridine form a crosslinked base film;
   b. allowing the base film composition to dry on the floor;

c. applying a sacrificial film composition to the floor on top of the base film, the sacrificial film composition comprising an aziridine-free polymer selected from the group consisting of polyurethanes, polyacrylates, and mixtures thereof, d. allowing the sacrificial film composition to dry on the floor; and e. applying a disinfecting agent to the floor, wherein the disinfecting agent comprises an antimicrobial component selected from the group consisting of an alcohol, an aldehyde, an antimicrobial acid, a carboxylic ester, an acid amine, a phenol, a phenol derivative, a diphenyl, a diphenyl alicane, a urea derivative, an oxygen acetal, a nitrogen acctal, an oxygen formal, a nitrogen formal, a benzamidine, an isothiazoline, a phthalimide derivative, a pyridine derivative, an antimicrobial surface-active compound, a quaternary ammoniunm compound, an antimicrobial alkylamine, a guanidine, an antimicrobial amphoteric compound, a quinoline, 1,2-dibromo- 2,4-dicyanobutane, iodo-2-propinylbutyl carbamate, iodine, an iodophor, and a peroxide.

2. The method of claim 1, further comprising mixing the polymer dispersion and the aziridine to form the base film composition prior to applying the base film composition to the floor, wherein prior to applying the base film composition to the floor, the polymer is packaged in a first container and the aziridine is packaged in a second container such that when the first and second containers are mixed to form the base film composition, the base film composition exhibits the ratio of the polymer and aziridine that is desired for the base film composition.

3. The method of claim 2, wherein the volume of the first or second container is sufficiently large enough to accommodate the contents of both the first and second containers.

4. The method of claim 1, wherein the base film composition further comprises a flattening agent.

* * * * *